US011668940B2

(12) United States Patent
Van Heugten

(10) Patent No.: US 11,668,940 B2
(45) Date of Patent: *Jun. 6, 2023

(54) SYSTEMS, DEVICES, AND/OR METHODS FOR PROVIDING IMAGES VIA A CONTACT LENS

(71) Applicant: e-Vision Smart Optics, Inc., Sarasota, FL (US)

(72) Inventor: Anthony Van Heugten, Sarasota, FL (US)

(73) Assignee: e-Vision Smart Optics, Inc., Sarasota, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/550,661

(22) Filed: Dec. 14, 2021

(65) Prior Publication Data
US 2022/0244539 A1 Aug. 4, 2022

Related U.S. Application Data

(63) Continuation of application No. 16/918,059, filed on Jul. 1, 2020, now Pat. No. 11,199,715, which is a (Continued)

(51) Int. Cl.
G02B 27/01 (2006.01)
G02C 7/04 (2006.01)
(Continued)

(52) U.S. Cl.
CPC ....... G02B 27/0172 (2013.01); G02B 27/017 (2013.01); G02C 7/04 (2013.01);
(Continued)

(58) Field of Classification Search
CPC . G02C 7/04; G02C 7/14; G02C 7/081; G02C 7/083; G02C 7/085; G02C 7/088;
(Continued)

(56) References Cited

U.S. PATENT DOCUMENTS 5,253,033 A 10/1993 Lipchak et al.
5,682,210 A 10/1997 Weirich
(Continued)

FOREIGN PATENT DOCUMENTS

CN 1320223 A 10/2001
CN 102271900 A 12/2011
(Continued)

OTHER PUBLICATIONS

International Search Report and Written Opinion in International Patent Application No. PCT/US2019/062110 dated Jan. 24, 2020, 13 pages.
(Continued)

Primary Examiner — Xuemei Zheng
(74) Attorney, Agent, or Firm — Smith Baluch LLP

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, via light from a light source, rendering an image on a retina.

17 Claims, 9 Drawing Sheets

Related U.S. Application Data continuation of application No. 16/214,333, filed on Dec. 10, 2018, now Pat. No. 10,732,416, which is a continuation of application No. 15/785,464, filed on Oct. 17, 2017, now Pat. No. 10,247,947, which is a continuation of application No. 14/649,267, filed as application No. PCT/US2012/068085 on Dec. 6, 2012, now Pat. No. 9,933,620.

(51) Int. Cl.
*G06F 3/01* (2006.01)
*G09G 3/32* (2016.01)

(52) U.S. Cl.
CPC .............. *G02B 2027/0178* (2013.01); *G02B 2027/0187* (2013.01); *G06F 3/011* (2013.01); *G09G 3/32* (2013.01); *G09G 2360/04* (2013.01); *G09G 2370/16* (2013.01)

(58) Field of Classification Search
CPC .............. G02C 7/101; G02B 27/0172; G02B 2027/0178; G02B 27/017
See application file for complete search history.

(56) References Cited

U.S. PATENT DOCUMENTS

| | | |
|---|---|---|
| 6,084,651 A | 7/2000 | Yamahara et al. |
| 6,169,594 B1 | 1/2001 | Aye et al. |
| 6,295,113 B1 | 9/2001 | Yang |
| 6,851,805 B2 | 2/2005 | Blum et al. |
| 7,018,040 B2 | 3/2006 | Blum et al. |
| 7,195,353 B2 | 3/2007 | Blum et al. |
| 7,758,187 B2 | 7/2010 | Amirparviz |
| 8,096,654 B2 | 1/2012 | Amirparviz et al. |
| 8,184,068 B1 | 5/2012 | Rhodes et al. |
| 8,786,675 B2 | 7/2014 | Deering |
| 9,375,885 B2 | 6/2016 | Pugh et al. |
| 9,375,886 B2 | 6/2016 | Pugh et al. |
| 9,933,620 B2 | 4/2018 | Van Heugten |
| 10,247,947 B2 | 4/2019 | Van Heugten |
| 10,732,416 B2 | 8/2020 | Van Heugten |
| 11,199,715 B2 | 12/2021 | Van Heugten |
| 2002/0044152 A1 | 4/2002 | Abbott et al. |
| 2003/0016905 A1 | 1/2003 | Kondoh et al. |
| 2004/0113867 A1 | 6/2004 | Tomine et al. |
| 2005/0099594 A1 | 5/2005 | Blum et al. |
| 2006/0227067 A1 | 10/2006 | Iwasaki |
| 2007/0220108 A1 | 9/2007 | Whitaker |
| 2008/0002262 A1 | 1/2008 | Chirieleison et al. |
| 2009/0189974 A1 | 7/2009 | Deering |
| 2009/0322861 A1 | 12/2009 | Jacobs et al. |
| 2010/0001926 A1 | 1/2010 | Amirparviz et al. |
| 2010/0045571 A1 | 2/2010 | Yamamoto |
| 2010/0053121 A1* | 3/2010 | Sprague ............ G02B 27/0172 345/204 |
| 2010/0103368 A1 | 4/2010 | Amirparviz et al. |
| 2010/0110372 A1 | 5/2010 | Pugh et al. |
| 2010/0309295 A1 | 12/2010 | Chow |
| 2011/0096100 A1* | 4/2011 | Sprague ................ G02C 7/12 359/492.01 |
| 2012/0140167 A1* | 6/2012 | Blum ...................... G02C 7/04 351/159.73 |
| 2012/0245444 A1 | 9/2012 | Otis et al. |
| 2012/0277568 A1 | 11/2012 | Chiou et al. |
| 2015/0015814 A1 | 1/2015 | Qin |
| 2019/0113757 A1 | 4/2019 | Van Heugten |

FOREIGN PATENT DOCUMENTS

| | | |
|---|---|---|
| EP | 0562742 A1 | 9/1993 |
| JP | H06138499 A | 5/1994 |
| JP | H08205052 A | 8/1996 |
| JP | H11127402 A | 5/1999 |
| JP | 2001027740 A | 1/2001 |
| JP | 2005311823 A | 11/2005 |
| JP | 2006292883 A | 10/2006 |
| JP | 2013541049 A | 11/2013 |
| WO | 2006015315 A3 | 4/2007 |
| WO | 2008109867 A2 | 9/2008 |
| WO | 2012051167 A1 | 4/2012 |
| WO | 2012051223 A2 | 4/2012 |

OTHER PUBLICATIONS

Lingley, "A single-pixel wireless contact lens display", Nov. 22, 2011, 8 pages, Journal of Micromechanics and Microengineering, 21 (2011) 125014.

Parviz, "For your eye only." IEEE Spectrum 46.9 (Sep. 2009): 36-41.

* cited by examiner

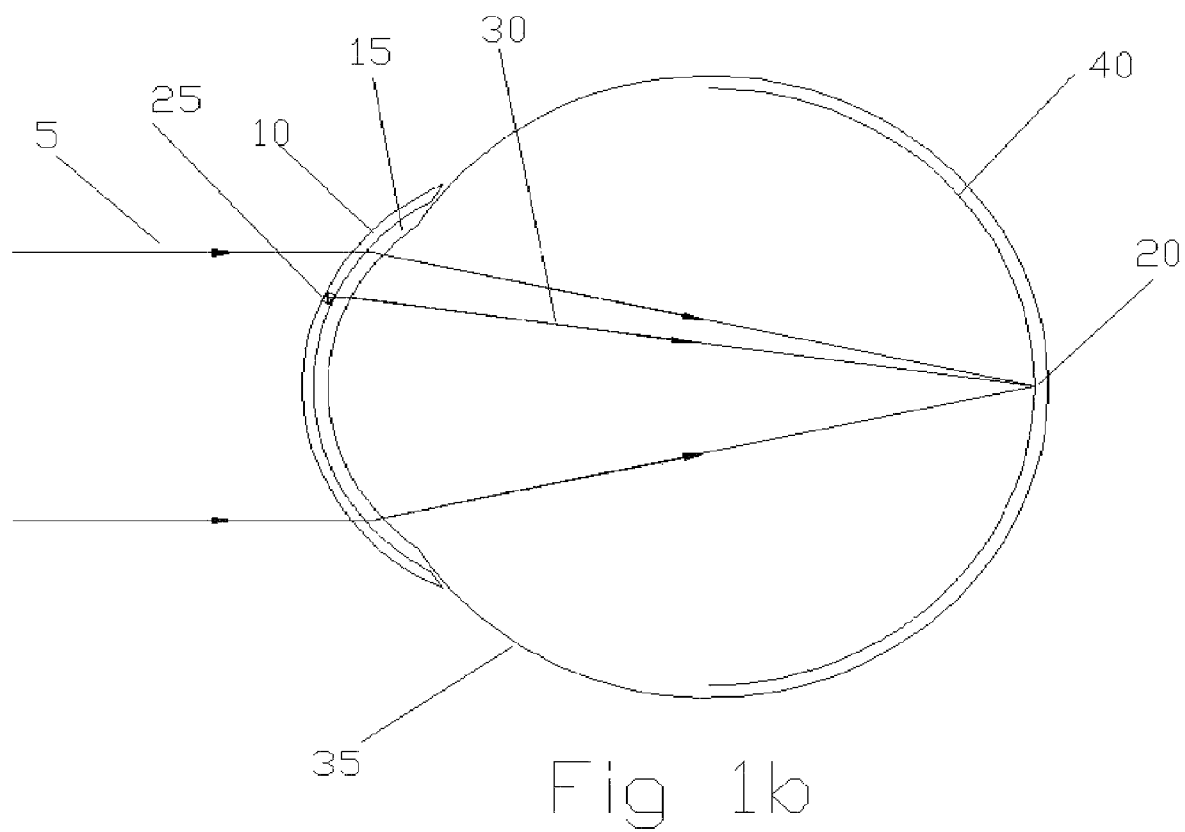

SYSTEMS, DEVICES, AND/OR METHODS FOR PROVIDING IMAGES VIA A CONTACT LENS

CROSS-REFERENCES TO RELATED APPLICATIONS

This application is a continuation of U.S. application Ser. No. 16/918,059, filed Jul. 1, 2020, which is a continuation of U.S. application Ser. No. 16/214,333, filed 10 Dec. 2018, which is a continuation of U.S. application Ser. No. 15/785,464, filed 17 Oct. 2017, which is a continuation of U.S. application Ser. No. 14/649,267, filed 3 Jun. 2015, which is a 371 national-stage application of PCT/US2012/068085, filed 6 Dec. 2012. Each of these applications is incorporated herein by reference in its entirety. This application also incorporates by reference herein in its entirety U.S. Provisional Patent Application 61/567,445, filed 6 Dec. 2011.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 1b is a cross-section taken along section A-A of FIG. 1a;

FIG. 2 is a cross-section taken along section A-A of FIG. 1a;

FIG. 3 is a cross-section taken along section A-A of FIG. 1a;

DESCRIPTION

Figure 1A:
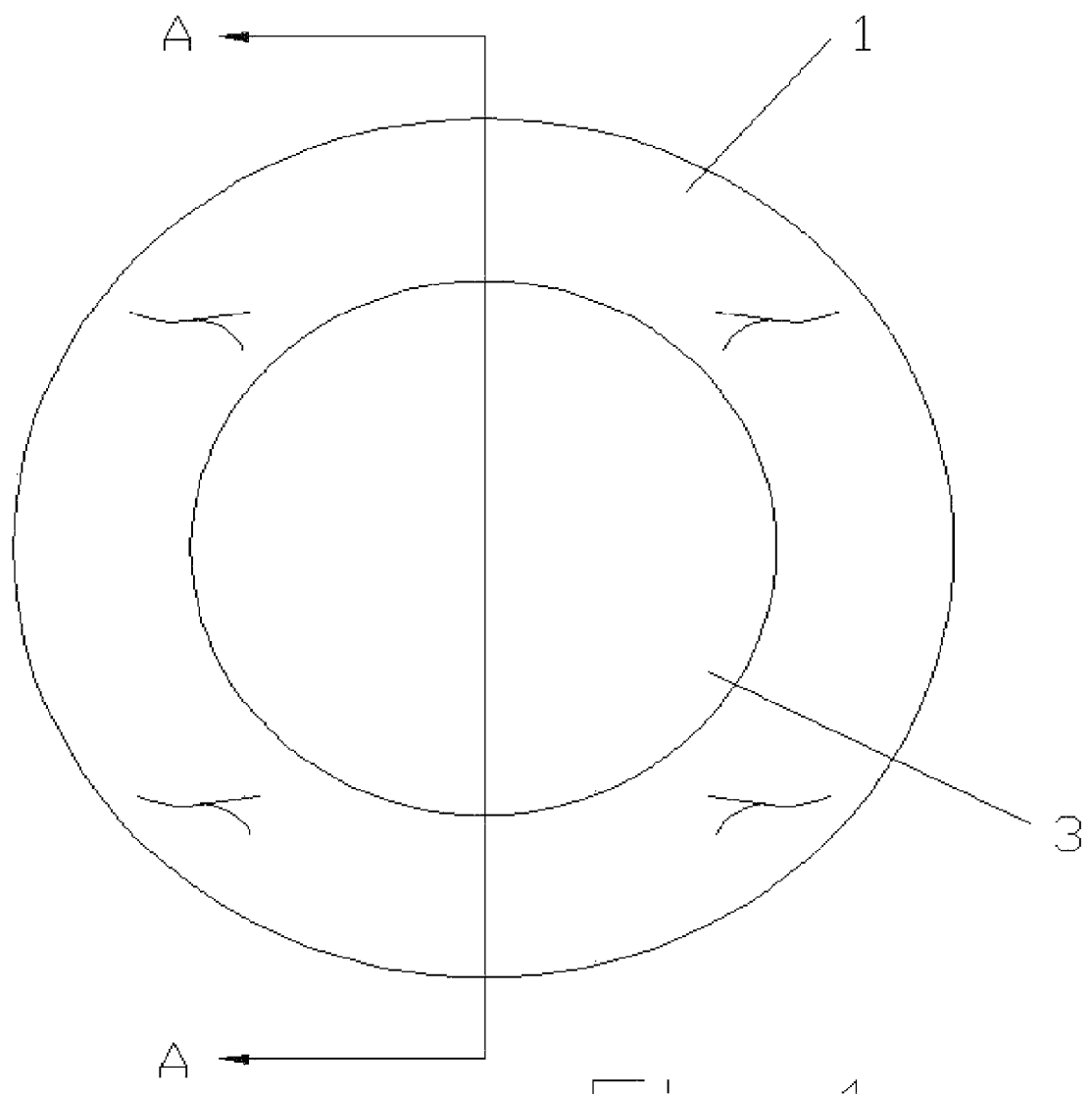
FIG. 1a is a front view of an eye 1.

It is possible to mount, in and/or on the eye of a wearer, one or more devices that contain Light Emitting Diodes ("LEDs"), and/or similar tiny electro-optic devices that emit light. An example is a contact lens having one embedded LED that can produce a single spot in the field of view of the eye of the wearer. Such light emitting devices can allow images to be formed on the retina of the wearer, such as those described in any of the following published documents:

"A single-pixel wireless contact lens display", Lingley et al, 2011 J. Micromech. Microeng. 21 125014;
United States Patent Application Publication 20050099594
United States Patent Application Publication 20100001926;
United States Patent Application Publication 20120245444;
United States Patent Application Publication 20120277568;
International Patent Application WO/2008/109867;
International Patent Application WO/2012/051223;
U.S. Pat. No. 6,851,805
U.S. Pat. No. 7,758,187;
U.S. Pat. No. 8,096,654;
U.S. Pat. No. 8,184,068;
each of which published documents is incorporated by reference to the extent it teaches how to operably implement (i.e., make and/or use) any portion of any embodiment of a lighting-emitting contact lens adapted to form one or more predetermined images on a retina of its wearer and/or adapted to perform a function described herein.

However, in order to accomplish this, lenses of positive optical power typically must be used between the light emitting device and the retina so as to allow the light from the emitting device to form a small enough spot for the retina to discern the spot.

The amount of optical power required to focus a spot of light on the retina can vary from person to person since the optical power of the eye typically varies from person to person. Additionally, the optical power of the cornea can vary from location to location within the same cornea of a single individual. Also, the location of the section of the retina that the spots must be projected to typically varies from person to person. For a spot to be perceived as being in the center of the person's vision, the spot typically must be projected onto the center of the fovea of the retina. As the spot is projected onto a location further away from the center of the fovea, the spot is typically perceived to be further out from the center of the person's visual field.

Forming many spots on the retina can allow images more complex than a single spot to be seen. By projecting onto a person's retina a pattern of spots of a known size, such as a series of concentric circles or a grid of dots, the person might report what they see as it appears to be overlaid upon the real-world images that they see. Moreover, the relationship between distance-from-center and angular field of view can be determined, such as via a diagnostic instrument such as a wavefront sensor, e.g., a laser ray tracing analyzer, a spatially resolved refractometer, an optical path difference scanner, a Tscherning aberrometer and/or aberroscope, and/or a Hartmann-Shack wavefront sensor, etc. With this data and/or other data from a wavefront sensor, a person's eye magnification can be mapped and/or the projected images calibrated to the correct size and/or location, which can ensure that the overlaid images will appear in the desired location in a person's vision. Temporal and/or spatial variations and/or aberrations in the optical power of the eye can be measured by the wavefront sensor, providing sufficient information to adjust optical power of the light source and/or its associated optics to form one or more desired spots on the retina.

Forming multiple spots on the retina of a person (or other animal) in a controlled manner can form images that can be seen by the person as useful data. Such images might be perceived as text, graphics, photographic images, animations, and/or video. Having the capability to project such data onto the eye of a person via the use of a contact lens can be useful and/or valuable because it can allow a data interface to be worn by the person in a very small, light, and/or unobtrusive package, that is potentially unnoticed by others. Currently, such a capability for a person to observe such images can only be obtained by projections systems located outside of the eye, which tend to be bulky and/or heavier than desired head mounted displays, such as those sold by many retail sources such as Amazon.com.

Forming multiple spots is one approach to having the person and/or user perceive seeing multiple spots. Another approach can be to scan a spot quickly over an area of the retina faster than the retina is sending images to the brain. For example, if a single spot was moved around in a circular pattern at a rate of speed of 200 complete circles per second, the typical user would see a solid circle rather than a spot travelling in a circular motion. For example, complex images and/or graphics can be created by rapidly tracing the path of the spot over the desired shape of one or more graphics to be produced. To create one or more desired graphics, one could utilize a single light source and spot, a single light source broken into several beams by using beam splitters, thus forming into multiple spots, and/or multiple light sources and multiple spots. Generally speaking, the more spots that are used, the more complex the graphics can become. For example, if the number six followed by a period was desired (i.e., "6."), the movement of the spot could scan and/or trace those symbols, then the light source could be switched off while the optics repositioned the beam so that when the light source was switched on again, it could be in the location of the period. Before the optics repositioned the beam to begin the tracing of the six, the light source again could be switched off until the beam was aimed at the starting point of the six, then switched on once there. This movement could be rapidly repeated for as long as that particular graphic was desired.

In light of the above, it can be desirable to be able to adjust the optical power of the lenses used to focus the projected spot on the retina being created by a light source within a contact lens. Additionally, it can be desirable to be able to adjust the vertical and/or horizontal direction of the projection to direct the projected spots to the optimal location on the retina for a particular wearer of the lens. Furthermore, it can be desirable to be able to adjust the vertical and/or horizontal direction of the projection such that the projected spot(s) is not simply static in one place, but can be quickly moved about to other places on the retina to perform the duty of multiple spots.

Certain exemplary embodiments can adjust the focus of the projection of the spot of the light onto the retina. Certain exemplary embodiments can steer the projected spot, or spots, of light to various locations on the retina, which can be useful for, e.g., conducting the visual field test used to track the occurrence and/or progression of glaucoma and/or damage to the optic nerve of the wearer.

A light emitting diode (LED), an OLED, a micro light bulb, a laser, super luminescent diode or any other types of point-source light generators, can be placed in a device capable of being placed in or on the eye. These light sources can be very thin and/or can be molded within the device itself by encapsulating it during the fabrication process An example method of encapsulation would be to locate the light source inside of a mold, then inject the molding material, which is in a liquid state, into the mold such that it flows all around the light source and fills the mold. Once the molding material has become solid, either by cooling or curing, the mold is opened and the device is removed from the mold with the light source encapsulated within. The LED can be oriented to direct its light toward the inside of the eye.

The light being directed by the LED toward the inside of the eye can be refracted, or bent, a sufficient amount to allow the natural optical structures of the eye to bring the light to a point of focus on the retina. This can be accomplished by the use of a conventional refractive lens working in conjunction with an electro-active lens, or by providing an electro-active lens without a conventional lens. The electro-active lens can be either a focusing lens, a steering lens, or a combination of both types. If both types are used, the steering lens can be capable of steering light in at least two directions, preferably orthogonal to each other.

When it is desired to create only a single point source of light on the retina by a single LED, for example when a single on/off indicator point is needed to alert the user of an external on/off event such as that a car is in the driver's blind spot when driving, the focusing electro-active lens can be adjusted to fine tune the overall optical system, which can include the LED, the electro-active lens (and possibly the conventional lens), and/or the optical structures of the user's eye to achieve a optimum spot size on the retina. The optimum spot size on the retina generally can be thought of as being the smallest possible size, but it also can be desirable to have the spot size be not necessarily the smallest possible size, and it might need to be larger, depending upon the application. For example, in the on/off driving indicator use described above, a larger dot might be wanted to increase visibility of the dot. However, in situations where multiple dots are used to form text, a combination of smaller dots might be desired so as to create sharper, less defocused images with greater resolution. If the LED is activated without the electro-active lens activated, the spot size is desired to be smaller, and/or the point of focus of the light from the LED occurs before the light reaches the retina, then the electro-active lens can introduce negative, or diverging optical power. If the point of focus has not yet occurred by the time the light reaches the retina, then the electro-active lens can introduce positive, or converging optical power.

This basic assembly can be replicated for two or more LEDs, such as to create an array of any closed geometric shape. Such an array can project images on the retina such that each LED contributes one pixel of observed light on the retina.

If the light from one or more LEDs is not forming spots in the desired location of the retina, then the steering electro-active lenses can direct the spots to the desired location by tipping and/or tilting.

The electro-active steering lenses can allow one or more LEDs to perform the duty of two or more pixels. By steering the light from an LED, the spot can "write" a complex image on the retina. The pattern of spots can be controlled by a controller (such as a microprocessor, programmable logic controller, field programmable gate array, and/or an application specific integrated circuit, etc., known to those skilled in the art of computer electronics. The controller can be either embedded inside of the contact lens, by encapsulation during the molding process when the contact lens is fabricated or located outside of the contact lens and in communication with the contact lens, such as via wires and/or wireless communication devices, mechanisms, and/or processes that are known to those skilled in the art of wireless communication electronics. The controller can be electronic circuitry known to those skilled in the art of making and programming graphics displays.

The images can be created by standard graphics software widely used on computers, such as PaintShop or Paint, and/or can be in any known file format, such as BMP, GIF, PNG, TIFF, JPG, PSP, PSD, EXIF, RAW, CGM, SVG, PPT, VML, HPGL, ODG, DWG, DXF, VRML, 3DXML, STL, U3D, PICT, PDF, MPO, PNS, JPS, HTML, HTML5, SWF, AVI, MOV, WMV, MPEG, MP4, RM, and/or Ogg, etc.

The writing can be done with the light being produced in a continuously on mode, and/or the light can be pulsed to produce the effect of a discreetly pixilated image. Several of such devices can work in conjunction so that each individual device can perform the work of creating a portion of the desired image while the other devices fill in the remaining portions, and/or the single LED working in conjunction with the electro-active steering lens can perform the job of creating the entire image.

Multiple LEDs, each potentially providing light that has a color that is different from the color of the light provided by one or more of the others, can be used to create color images on the retina. Single color images might be adequate for simple information such as text-only messages, yet color images might add more richness to the information by being able to, e.g., change the color of text and/or words that the user's attention must be drawn to. For example, if projecting driving information to the wearer, a low fuel level can be projected to the wearer with a higher level of urgency if the fuel level information was projected in a color different from other commonly and/or concurrently displayed colors. In another example, video streams can be much more pleasing and/or entertaining if presented in multiple colors rather than a single color, much like, for many viewers, color TV is often more pleasing than black and white TV.

Via certain exemplary embodiments, single and/or multiple LEDs can be used to generate multiple images that can appear to the wearer as being simultaneously presented. Thus, continuing with the automobile driver example, one LED can display a single color icon indicating a low fuel warning, and/or multiple LEDs can present a color "rear-view mirror" video-type display.

Certain exemplary embodiments can provide for device switching mechanisms, such as switches to turn on or off certain types of images, displays, LED arrays, and/or LEDs. Some such switches can be activated by the controller based on the relative and/or absolute direction of a wearer's gaze, while others can be activated depending on the relative and/or absolute position and/or movement direction of a user's head, body, vehicle, etc. For example, the above described color "rear-view mirror" video-type display could be presented only when the user shifts their gaze toward the upper right and/or looks in the traditional direction of a rear view mirror as seen by a driver, perhaps only while the wearer is driving, or perhaps at any time (e.g., "I now have eyes in the back of my head"). As another example, an image could be rendered only upon the occurrence of a particular event, such as the receipt of a communication (e.g., e-mail, text message, reminder, alarm, etc.), the detection and/or recognition of a predetermined and/or unexpected sound, the expiration of a timer, the crossing of a geo-fence, the positioning of a user within a predetermined distance of a given entity (e.g., object, person, animal, etc.), a low light situation (e.g., rendering a wearer's surroundings as detected via an infrared and/or night vision camera), and/or the detection of a change in a predetermined state of the wearer and/or another person and/or animal (e.g., a rise in the user's blood pressure beyond a predetermined limit, a seizure incident, an undesired level of blood glucose, insulin, and/or other predetermined substance (e.g., a neurotransmitter, hormone, nutrient, pharmaceutical, environmental substance (e.g., oxygen, carbon monoxide, etc.), etc.), the transition of the wearer or another entity (such as an infant or patient) to an awake state (e.g., providing a status update to the wearer in reaction to a change in a particular type of macroscopic neural oscillation), etc.), etc.

Certain exemplary embodiments can couple an image with audio information, such as information delivered to a wearer via a speaker, headset, earbud(s), hearing aid, and/or cochlear implant, etc. For example, a low fuel warning image could be preceded, accompanied, and/or followed by a related audible low fuel warning delivered via an earbud and/or automobile speaker.

Likewise, certain exemplary embodiments can couple an image with haptic (e.g., tactioceptive (touch), proprioceptive (relative body and/or joint motion), thermoceptive (temperature), nociceptive (pain), equilibrioceptive (balance), kinesthesioceptive (acceleration), chemoreceptive (gustation, olfaction, etc.), magnetoceptive (direction), chronoceptive (perception of time), etc.) information, such as information delivered to a wearer via a vibrator, tactor, data glove, heater, cooler, airstream, force feedback mechanism, ultrasound transducers, etc. For example, a visual image communicating a low fuel warning could be preceded, accompanied, and/or followed by a related haptic communication delivered via a vibrotactile effector such as a vibrator and/or tactor.

FIG. 1a is a front view of an eye 1 of a human from the perspective of looking directly through contact lens 3 into the cornea of that human's head while that head is oriented in an upright position (e.g., the opening of the human's nostrils would be oriented downwards (i.e., toward the phrase "FIG. 1a") such that the longitudinal axis of the human's nose would be oriented parallel to section A-A.

Figure 2:
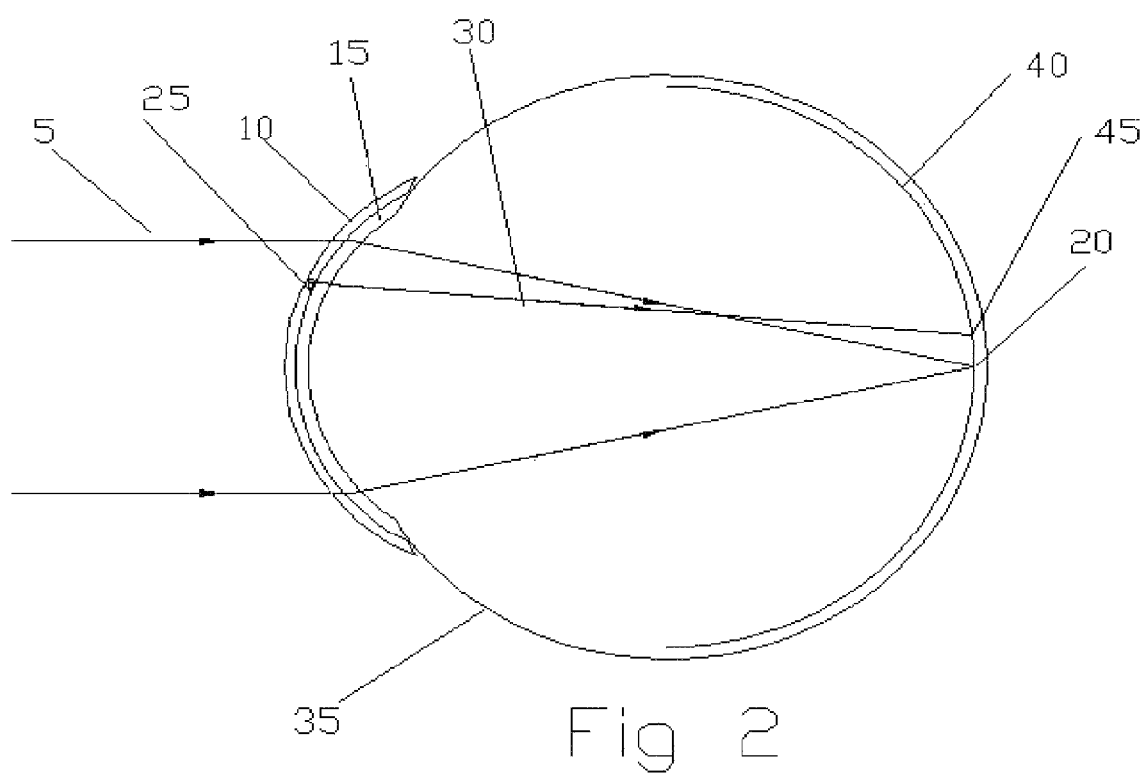
Figure 3:
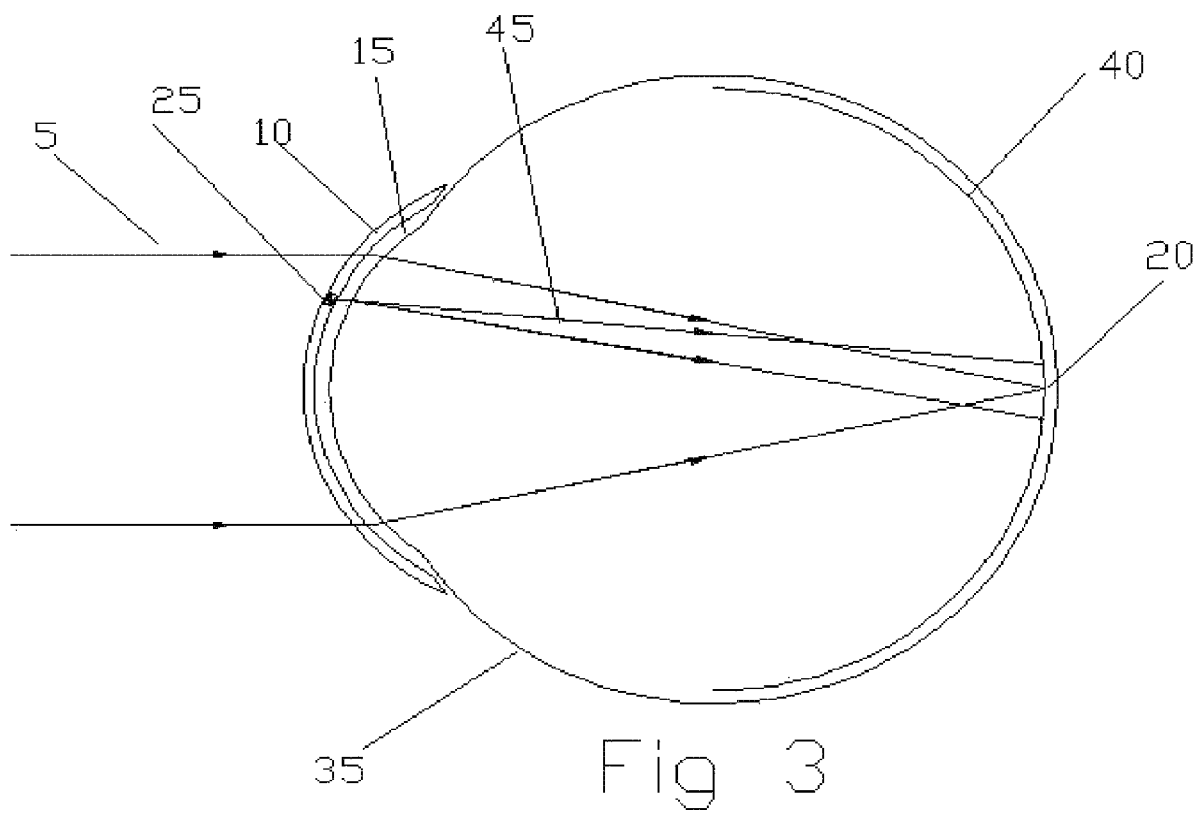

For purposes of clarity, FIG. 1b, FIG. 2, and FIG. 3 are cross-section drawings of the eye, limiting the optical depictions to two dimensions. Those skilled in the art of optics understand this drawing convention and can relate these to three dimensional optical effects in the real world optical systems.

FIG. 1b is a cross-section taken along section A-A of FIG. 1a, and shows an Eye 35 of a person, with Light Beams 5 entering Eye 35, and coming to focus at Point 20. Point 20 can be the fovea of Eye 35, which can be the center of vision of Eye 35. The densest concentration of photoreceptors in Eye 35 can be found in Retina 40. Light Beams 5 can pass through Contact Lens 10 and be refracted somewhat, then can pass through Cornea 15 and be refracted an additional amount. Light Source Assembly 25 can be embedded inside of Contact Lens 10. Light Source 25 can provide a point source of light that can be directed toward Retina 40, and after passing through Cornea 15, can continue to be a Beam of Light 30 that can form a point of light on Retina 40. When the point of light is desired to be perceived in the center of the person's field of view, the point of light can be formed at Point 20. If the point of light forms elsewhere on Retina 40, e.g., outside the fovea centralis and/or the macula, such as in a peripheral regions, on the parafovea belt, and/or the perifovea outer region, it can be perceived in the person's peripheral view.

FIG. 2 is a cross-section taken at section A-A of FIG. 1a, and shows Eye 35 and Beam of Light 30 directed toward Retina 40 at a slightly different angle, resulting in a point of light forming at Point 45, slightly above Point 20. This will be perceived by the person as a point of light that is below the center of their field of view (not perceived above because the actual images produced on the retina are inverted, and the brain sorts out the up and down orientation).

FIG. 3 is a cross-section taken at section A-A of FIG. 1a, and shows Eye 35 and Light Source 25 providing a point source of light directed toward Retina 40, and after passing through Cornea 15, can become a Cone of Light 45 that forms a Blob of Light on Retina 40. The upper and lower boundaries of the Blob of Light are above and below Point 20. In this condition the user would perceive a diffuse circle of light larger than a point of light.

Figure 4:
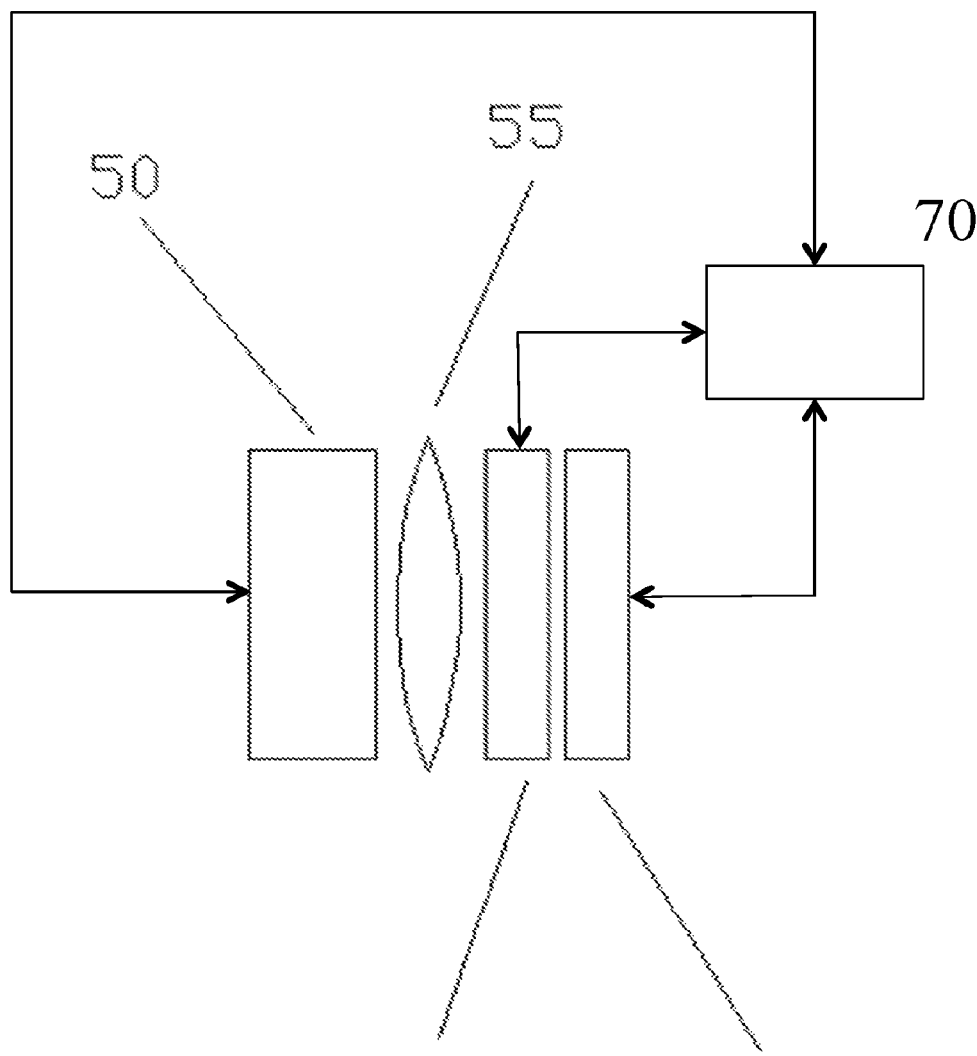
FIG. 4 is a block diagram.

FIG. 4 is a block diagram that shows certain major components of an exemplary embodiment of a light source module 400. Light Source 50, which can produce light, can be an LED or some other type of light emitting source such as a OLED. Collimating Lens 55 can provide optical power to focus the light emitting from Light Source 50 from a widely diverging beam to a less diverging beam that is close to the average optical divergence required to pass through the eye and form a point of light on the retina. The optical focus power at the cornea can be minimal because the light source can be in physical contact with the contact lens and/or cornea, so the major optical power to contend with can be that provided by the crystalline lens of the eye. This lens typically provides between 5 and 15 diopters of optical power. Some people's eyes have more or less optical power than the average, so Electroactive Lens 60 can provide the adjustable optical power required to compensate, within this typical range of approximately 5 and approximately 15 diopters, for the more or less optical power so as to form the desired small spot size on the retina. Electroactive Prism 65 can provide adjustable beam steering to direct the spot of light to various locations on the retina. An exemplary beam steering configuration can be to have the prism provide up/down steering and side-to-side steering. This can utilize two layers of liquid crystal, one layer for the up/down and a second layer for side-to-side. Controller 70 can control light source 50, electro-active lens 60, and/or electro-active prism 65. Controller 70 can be powered via battery and/or wirelessly.

Figure 5:
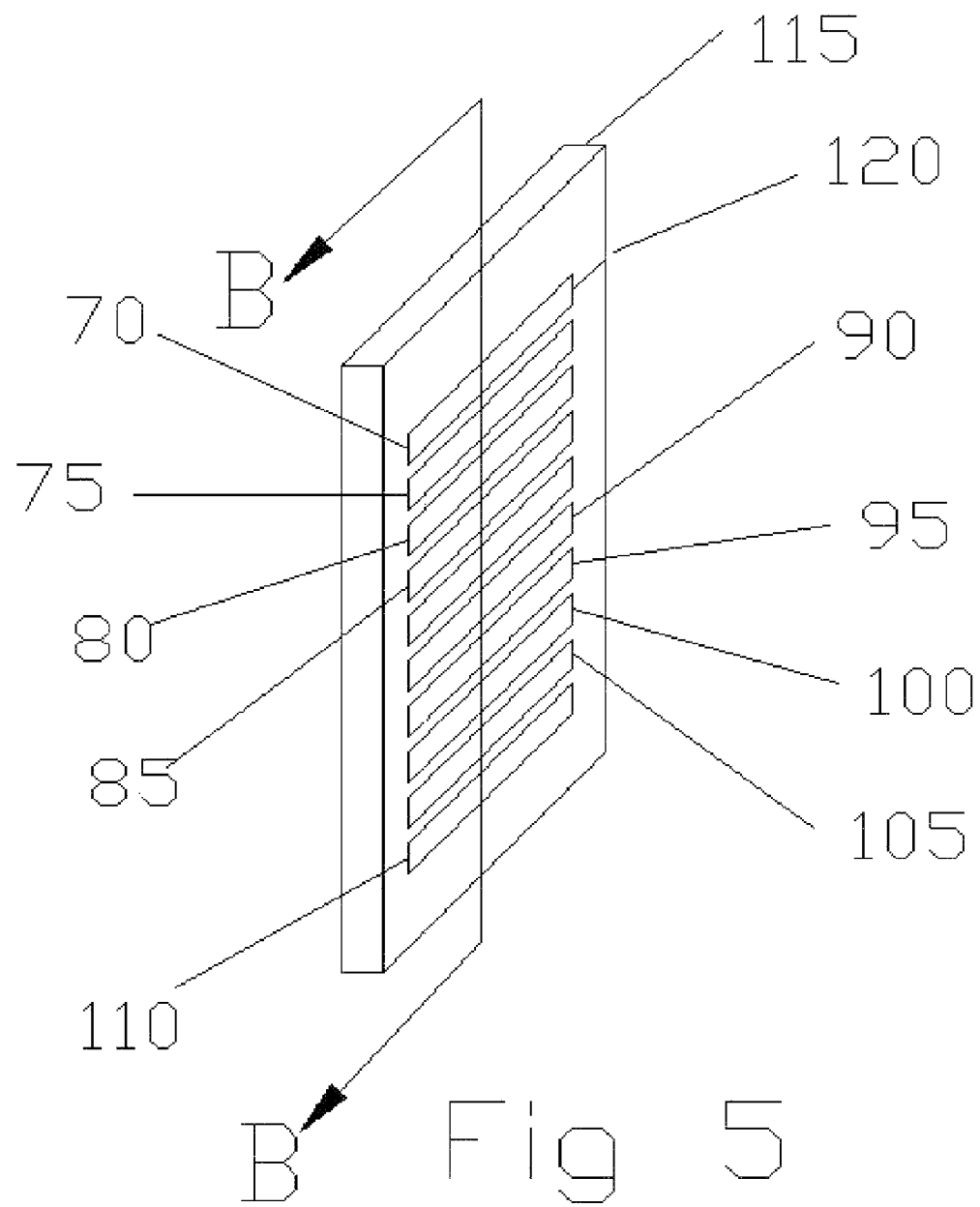
FIG. 5 is a perspective view of a layer of an electroactive prism.

FIG. 5 is a perspective view of a layer of an electroactive prism 500. Substrate 115 can be made from a clear glass or plastic material (for example soda lime glass), then a pattern of ITO (Indium Tin Oxide) having a resistance of between approximately 5 and approximately 10,000 ohms per square, such as approximately 100 ohms per square can be placed on the surface of substrate 115 by lithography. In an exemplary device, the glass can be approximately 1 mm tall by approximately 1 mm wide, by approximately 50 microns thick but could be between approximately 0.05 mm and approximately 3 mm in width and/or height, and/or between approximately 5 and approximately 1,000 microns in thickness. As shown for this particular embodiment, nine ITO electrodes 70 through 110 can be patterned onto the surface of glass 115 [?], each potentially being approximately 0.08 mm wide by approximately 0.9 mm in length, with an approximately 3 micron gap between each but could be between approximately 0.01 and approximately 1 mm wide by 0.05 mm and/or 3 mm in length. Each electrode can have an electrical connection lead 120 attached to one end. In this figure, only electrode 70 shows an electrical connection, but all the electrodes can have one. An insulation layer such as silicone dioxide can be placed over the surface of the substrate 115, then an alignment layer such as polyimide can be placed over the insulation layer, then rubbed. The placement, composition, and rubbing of these layers are known to those skilled in the art of liquid crystal lens making. A second substrate of similar size (not shown), with a coating of ITO on it, can be placed over the surface of Substrate 115 and attached to it, potentially with adhesive, but possibly only in the areas where no electrodes exist. Mixed within the adhesive can be spacer beads of a consistent diameter, such as approximately 10 microns (but they could range in size between approximately 1 and approximately 50 microns), whose purpose can be to create a uniform gap between the two substrates. Liquid Crystal can be deposited in the approximately space created by the beads between the two substrates.

Figure 6:
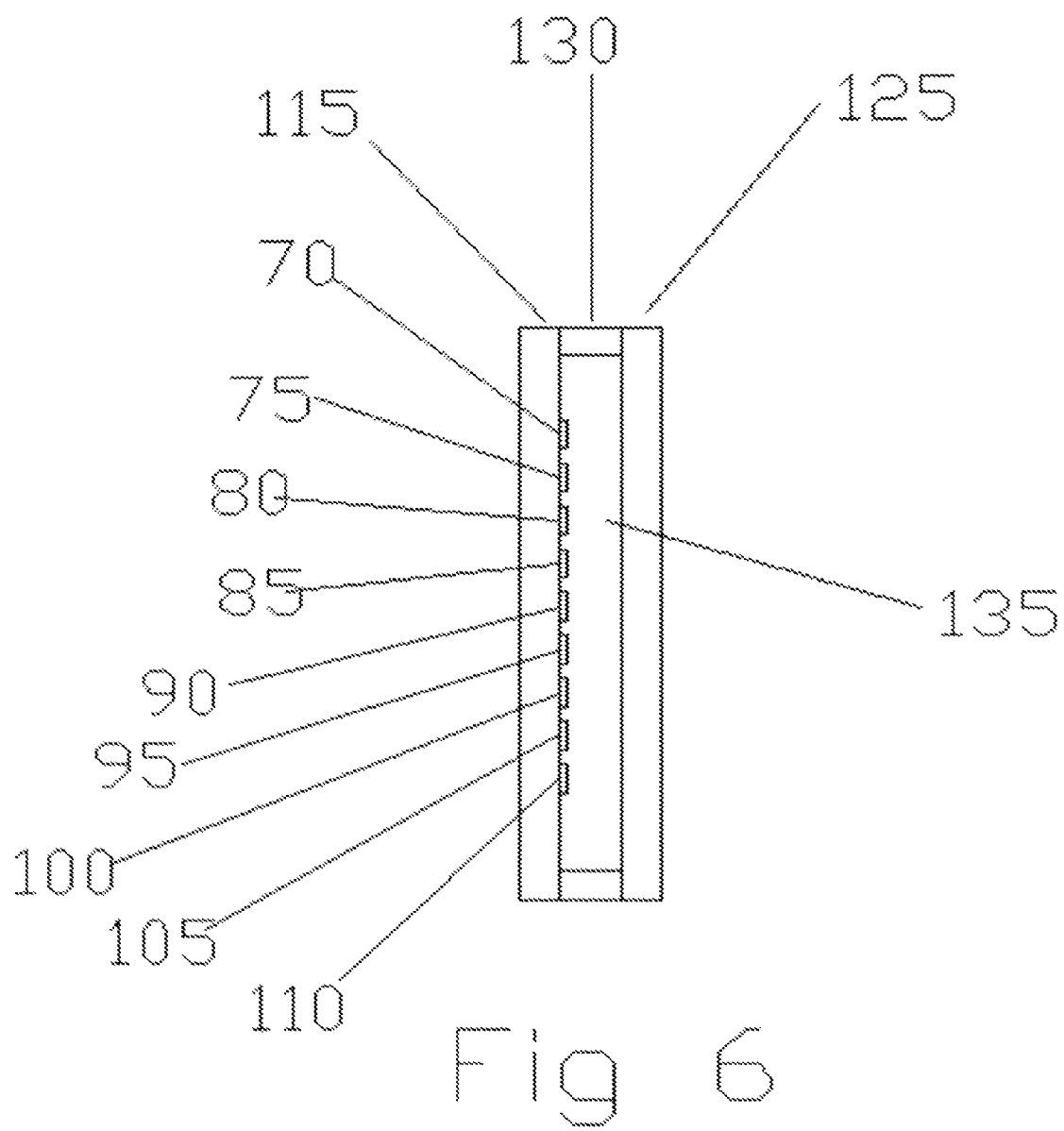
FIG. 6 is a cross section taken at section B-B of FIG. 5.

FIG. 6 is a cross section taken at section B-B of FIG. 5 and shows an electroactive prism 600. Substrate 115 can be bonded to Substrate 125 with Adhesive 130, forming Gap 135, which can be filled with liquid crystal. Electrodes 70 through 110 are shown.

An electrical potential can be applied across any of electrodes 70 through 110 on one side of the circuit, and the ITO layer of Substrate 125 on the other side of the circuit. Each of electrodes 70 through 110 can be individually addressed with a unique electrical voltage value. The voltages can be between approximately zero and approximately 10 volts, and/or can have a substantially square waveform with a frequency of approximately 100 hertz. When approximately zero volts are applied to the electrodes, the molecules of liquid crystal filling gap 135 can align themselves to the orientation of the rub direction of the alignment layer and/or exhibit a desired index of refraction. When an electric voltage is applied across the electrodes on Substrate 115 and the ITO layer of Substrate 125, the electric field can causes the molecules to turn in the direction of the electric field. A small amount of electrical voltage, for example approximately 1.5 volts, can cause the liquid crystal molecules to turn a partial amount away from the alignment layer, and a large amount of electrical voltage, for example approximately 5 volts, can cause the molecules to turn all the way away from the alignment layer. The greater the amount of turning away from the alignment layer, the higher the index of refraction typically will be for the liquid crystal. The amount of turning is typically an analog amount based upon the analog potential value of the electrical voltage, so the amount of change of index of refraction can be controlled by changing the voltage potential in an analog and/or continuously varying manner. If a gradient of voltages were to be applied to the electrodes, for example electrode 70 can have approximately 1.5 volts, electrode 75 approximately 1.6 volts, electrode 80 approximately 1.7 volts, and so on, the index of refraction of the liquid crystal can be lower in the zone around electrode 70, more in the zone near electrode 75, and so on. In a condition like this, a wavefront of light passing through the prism can be tilted upward. As the voltage gradient is increased, the amount of tilting can be increased. In this manner, the wavefront can be tilted in an analog and/or continuously varying manner. Incoming light beam 150 can become exiting light beam 155, tilted upward. Two of such devices can be utilized, placed orthogonal to each other, such that one device can tilt the light up/down, and/or the other device can tilt the light side-to-side. Such devices also can be made such that the electrodes are circular rather than linear, which can allow for spherical focus changes to be made rather than tip/tilting. Spherical focus changes can be utilized for adding or subtracting optical power to the wavefront of light to create a point of light on the retina. Tip/tilt changes can be utilized to direct the point of light to various locations on the retina.

Figure 7:
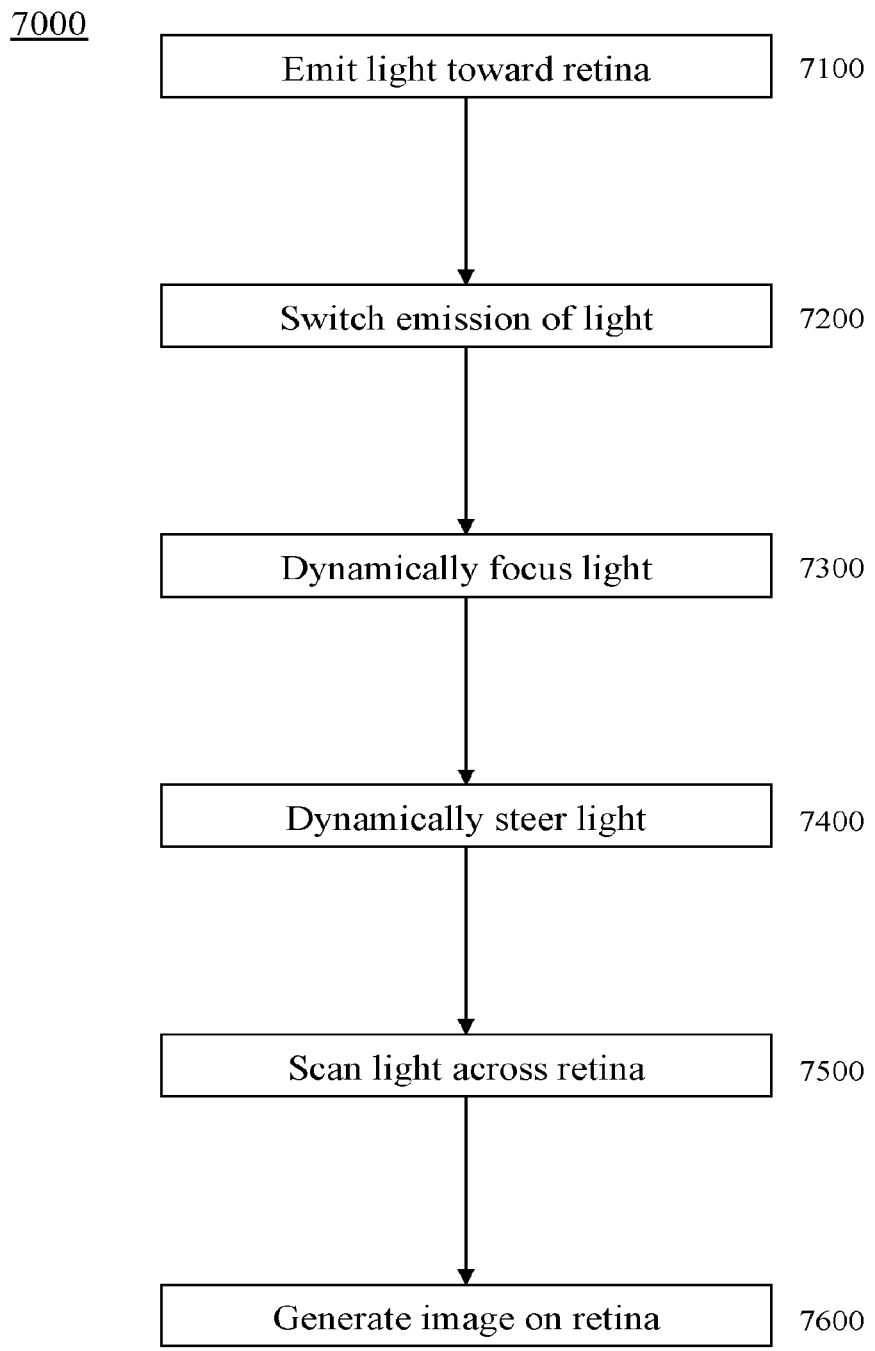
FIG. 7 is a flowchart of an exemplary embodiment of a method.

FIG. 7 is a flowchart of an exemplary embodiment of a method 7000. At activity 7100, light can be emitted from a light sourced embedded in a contact lens toward a retina of a wearer of the contact lens. At activity 7200, the light source and/or its emitted light can be switched, such as to cause and/or interrupt the emission of the light. At activity 7300, the light can be dynamically focused, such as onto the retina, such as via an electro-active lens. Before, during, and/or after reaching the electro-active lens, the light can be focused via a lens having a fixed optical power. At activity 7400, the light can be dynamically steered, such as to one or more predetermined locations on the retina. At activity 7500, the light can be scanned across one or more predetermined regions of the retina. At activity 7600, the light can generate and/or render one or more images on the retina.

Figure 8:
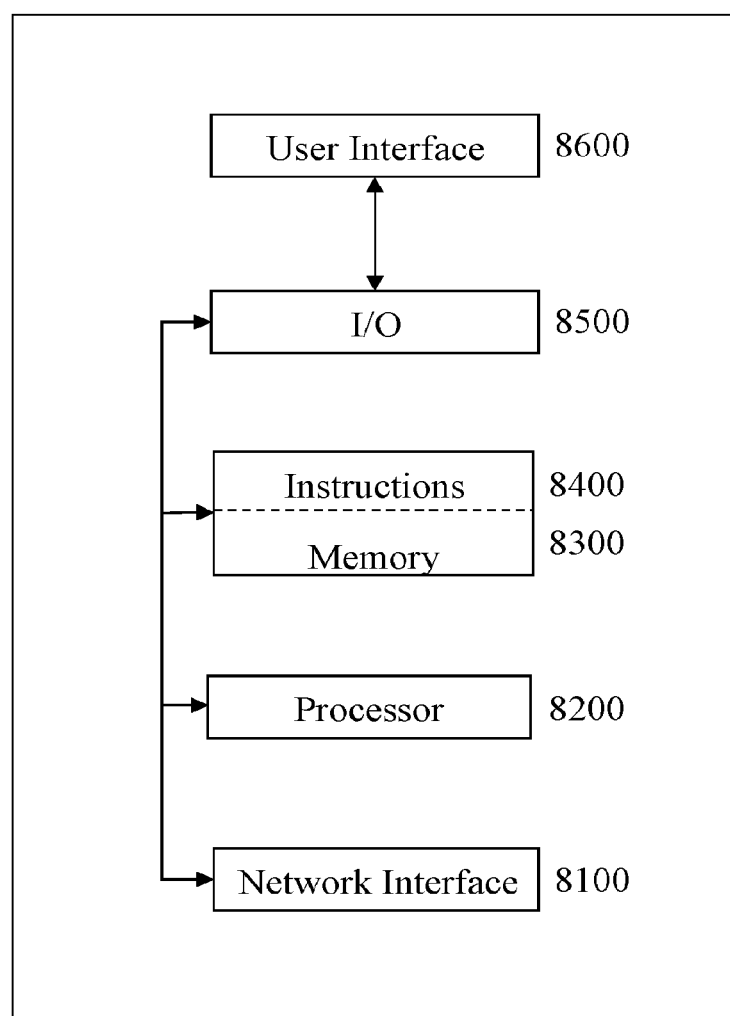
FIG. 8 is a block diagram of an exemplary embodiment of an information device.

FIG. 8 is a block diagram of an exemplary embodiment of an information device 8000, such as controller 70 of FIG. 4. Information device 8000 can comprise any of numerous transform circuits, which can be formed via any of numerous communicatively-, electrically-, magnetically-, optically-, fluidically-, and/or mechanically-coupled physical components, such as for example, one or more network interfaces 8100, one or more processors 8200, one or more memories

8300 containing instructions 8400, one or more input/output (I/O) devices 8500, and/or one or more user interfaces 8600 coupled to I/O device 8500, etc.

In certain exemplary embodiments, via one or more user interfaces 8600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, via light from a light source, generating and/or rendering a detectable image on a region of a retina.

Certain exemplary embodiments can provide a device comprising:
  a contact lens;
  a contact lens adapted to render one or more predetermined images;
  a contact lens adapted to render one or more portions of one or more predetermined images to a wearer of the contact lens;
  the contact lens comprising:
    a first light source;
    a first light source embedded in and/or mounted to the contact lens;
    a first light source embedded in and/or mounted to the contact lens, the first light source adapted to emit light toward a retina of the wearer;
    an electro-active lens;
    an electro-active lens adapted to focus the light onto the retina;
    an electro-active lens adapted to adjustably focus the light onto the retina;
    an electro-active lens adapted to dynamically focus the light onto the retina;
    an electro-active lens adapted to dynamically adjustably focus the light onto the retina;
    an electro-active prism;
    an electro-active prism adapted to steer the light;
    an electro-active prism adapted to dynamically steer the light;
    an electro-active prism adapted to adjustably steer the light;
    an electro-active prism adapted to steer the light in two orthogonal coordinate directions and toward one or more predetermined locations on the retina; and
    an electro-active prism adapted to dynamically adjustably steer the light in two orthogonal coordinate directions and toward one or more predetermined locations on the retina; and
    a controller adapted to:
      control emission of the light from the light source;
      dynamically control emission of the light from the light source;
      control focusing of the light by the electro-active lens;
      dynamically control focusing of the light by the electro-active lens;
      control steering of the light by the electro-active prism; and/or
      dynamically control steering of the light by the electro-active prism;
  the device further comprising:
    a power source for the contact lens;
    a power source wirelessly coupled to the contact lens;
    a gaze detector;
    an eye position detector; and/or
    an object position detector;
  the contact lens further comprising:
    a second light source adapted to emit light;
    a second light source adapted to emit light having a different color than light emitted by the first light source;
    a second light source adapted to emit light for generating a different image than that of the first light source;
    a collimating lens located in an optical path between the first light source and the electro-active lens;
    a collimating lens adapted to provide a fixed optical power to the light;
    a first electro-active prism layer adapted to steer the light with respect to a first coordinate direction;
    a first electro-active prism layer adapted to adjustably steer the light with respect to a first coordinate direction;
    a second electro-active prism layer adapted to steer the light;
    a second electro-active prism layer adapted to adjustably steer the light with respect to a second coordinate direction;
    a second electro-active prism layer adapted to adjustably steer the light with respect to a second coordinate direction that is substantially perpendicular to the first coordinate direction;
    a first electro-active prism layer adapted to steer the light;
    a first electro-active prism layer adapted to adjustably steer the light;
    a first electro-active prism layer adapted to adjustably steer the light with respect to a first radial direction;
    a first electro-active prism layer adapted to adjustably steer the light with respect to a first angular direction; and/or
    a beam splitter adapted to divide the light into multiple beams;
  wherein:
    the controller is embedded inside the contact lens;
    the controller is adapted to communicate with the first light source;
    the controller is adapted to wirelessly communicate with the first light source;
    the controller is adapted to communicate with the electro-active lens;
    the controller is adapted to wirelessly communicate with the electro-active lens;
    the controller is adapted to communicate with the electro-active prism;
    the controller is adapted to wirelessly communicate with the electro-active prism;
    the first light source is a light emitting diode;
    the first light source is an organic light emitting diode;
    the controller is adapted to control emission of the light;
    the controller is adapted to control emission of the light in a variable manner;
    the controller is adapted to control emission of the light in a continuously variable manner;

the controller is adapted to control emission of the light in a pulsed manner;
the controller is adapted to control emission of the light in a discrete manner;
the controller is adapted to control emission of the light in a discrete pulsed manner;
the controller is adapted to control optical power;
the controller is adapted to control optical power in a variable manner;
the controller is adapted to control optical power in a continuously variable manner;
the controller is adapted to control focus of the light;
the controller is adapted to control focus of the light in a variable manner;
the controller is adapted to control focus of the light in a continuously variable manner;
the controller is adapted to control steering of the light;
the controller is adapted to control steering of the light in a variable manner;
the controller is adapted to control steering of the light in a continuously variable manner;
the electro-active lens comprises a plurality of electrodes;
the electro-active lens comprises a plurality of circular electrodes;
the electro-active lens comprises a plurality of non-circular electrodes;
the electro-active lens provides spherical focus changes;
the controller is adapted to switch emission of the light;
the controller is adapted to switch emission of the light in response to a change in gaze direction of the wearer;
the controller is adapted to switch emission of the light in response to a change in an absolute gaze direction of the wearer;
the controller is adapted to switch emission of the light in response to a change in a relative gaze direction of the wearer;
the controller is adapted to switch emission of the light in response to a change in position of the eye;
the controller is adapted to switch emission of the light in response to a change in absolute position of the eye;
the controller is adapted to switch emission of the light in response to a change in relative position of the eye;
the controller is adapted to switch emission of the light in response to a change in position of a predetermined object;
the controller is adapted to switch emission of the light in response to a change in absolute position of a predetermined object;
the controller is adapted to switch emission of the light in response to a change in relative position of a predetermined object;
the controller is adapted to switch emission of the light in response to an occurrence of a predetermined event;
the controller is adapted to couple a switch in emission of the light with a predetermined action;
the controller is adapted to coordinate a switch in emission of the light with a predetermined action;
the predetermined location on the retina is outside of the macula.

Certain exemplary embodiments can provide method comprising:

generating an image on a retina;
generating an image on a predetermined region of a retina;
generating an image on a adjustable region of a retina;
generating an image on a predetermined and adjustable region of a retina;
generating a detectable image on a retina;
generating an adjustably focused detectable image on a retina;
generating an adjustably focused detectable image on the predetermined and adjustable region of a retina;
via light adjustably emitted from a light source embedded in a contact lens being worn on an eye of a wearer of the contact lens, generating an adjustably focused detectable image on the predetermined and adjustable region of a retina;
via light adjustably emitted from a light source embedded in a contact lens being worn on an eye of a wearer of the contact lens and scanned across a predetermined and adjustable region of a retina of the wearer, generating an adjustably focused detectable image on the predetermined and adjustable region of a retina;
emitting the light generally toward the retina;
switching the light;
controlling emission of the light from the light source;
dynamically controlling emission of the light from the light source;
providing a fixed optical power to the light;
focusing the light;
dynamically focusing the light;
controlling focusing of the light by an electro-active lens in an optical path of the light;
dynamically controlling focusing of the light by an electro-active lens in an optical path of the light;
steering the light;
dynamically steering the light;
control steering of the light by the electro-active prism;
dynamically control steering of the light by the electro-active prism;
scanning the light across the retina; and/or
scanning the light across the predetermined and adjustable region of the retina.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
aberration—one or more limitations and/or defects in an optical component, such as a lens and/or mirror, that is contacted by a plurality of light rays, such limitations and/or defects preventing the light rays from converging at one focus and potentially due to, e.g., the optical component comprising one or more surfaces that are not perfectly planar, such as one or more spherical surfaces.
absolute—something that is conceived or that exists independently and not in relation to other things; something that does not depend on anything else and is beyond human control; and/or something that is not relative.

acquire—to obtain, get, import, receive, and/or gain possession of.

across—from one side to another.

action—(n) a deed, act, activity, performance of a deed, act, and/or activity, and/or something done and/or accomplished. (v) to perform a deed, act, and/or activity.

activity—an action, act, step, and/or process or portion thereof.

adapted to—suitable, fit, and/or capable of performing a specified function.

adapter—a device used to effect operative compatibility between different parts of one or more pieces of an apparatus or system.

adjust—to change so as to match, fit, adapt, conform, and/or be in a more effective state.

align—to adjust substantially into a proper orientation and/or location with respect to another thing.

an—at least one.

and—in conjunction with.

and/or—either in conjunction with or in alternative to.

angular—measured by an angle and/or by degrees of an arc.

apparatus—an appliance or device for a particular purpose associate—to join, connect together, and/or relate.

auto-focus—a system in a camera that automatically adjusts the lens so that the object being photographed is in focus, often using a time delay associated with reflecting infrared light off of the object to estimate the distance of the object from the camera.

automatic—performed via an information device in a manner essentially independent of influence and/or control by a user. For example, an automatic light switch can turn on upon "seeing" a person in its "view", without the person manually operating the light switch.

beam of light—a projection of light radiating from a source.

beam splitter—a device adapted to split or join a light beam into or from two or more beams that differ in wavelength, polarity, and/or direction.

being—existing.

between—in a separating interval and/or intermediate to.

Boolean logic—a complete system for logical operations.

border—to be located and/or positioned adjacent to an outer edge, surface, and/or extent of an object.

bound—(n) a boundary, limit, and/or further extent of; (v) to limit an extent.

bus—an electrical conductor that makes a common connection between a plurality of circuits.

by—via and/or with the use and/or help of can—is capable of, in at least some embodiments.

capture—to sense, receive, obtain, enter, store, and/or record information and/or data in memory.

cause—to bring about, provoke, precipitate, produce, elicit, be the reason for, result in, and/or effect.

change—(v.) to cause to be different; (n.) the act, process, and/or result of altering and/or modifying.

circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.

circular—a substantially round shape in which all points on a perimeter of the shape are substantially equidistant from a center of the shape.

co-operate—to work, act, and/or function together and/or in harmony, as opposed to separately and/or in competition.

collimate—to make parallel.

color—(n.) a visual property dependent on the reflection or absorption of light from a given surface that has characteristics of hue, intensity, and value; (v.) to change a visual property dependent on the reflection or absorption of light from a given surface that has characteristics of hue, intensity, and value.

comprising—including but not limited to.

concentric—having a common central axis.

conductor—an electrically conductive material and/or component adapted to apply a voltage to an electro-active material.

configure—to make suitable or fit for a specific use or situation.

connect—to join or fasten together.

contact—to physically touch and/or come together.

contact lens—a substantially transparent ophthalmic device that fits over the cornea of the eye, that floats on the tears of the eye, and/or is held in place by one or more eyelids.

containing—including but not limited to.

contiguous—neighboring and/or adjacent.

continuously—in a manner uninterrupted in time, sequence, substance, and/or extent.

contrast—the difference in brightness between the light and dark areas of an image, such as a photograph and/or video image.

control—(n) a mechanical and/or electronic device used to operate a machine within predetermined limits; (v) to exercise authoritative and/or dominating influence over, cause to act in a predetermined manner, direct, adjust to a requirement, and/or regulate.

controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.

convert—to transform, adapt, and/or change.

coordinate—any of a set of two or more numbers used to determine the position of a point, line, curve, or plane in a space of a given dimension with respect to a system of lines or other fixed references.

corresponding—related, associated, accompanying, similar in purpose and/or position, conforming in every respect, and/or equivalent and/or agreeing in amount, quantity, magnitude, quality, and/or degree.

couple—to join, connect, and/or link by any known approach, including mechanical, fluidic, acoustic, electrical, magnetic, and/or optical, etc. approaches.

coupleable—capable of being joined, connected, and/or linked together.

coupled—connected or linked by any known means, including mechanical, fluidic, acoustic, electrical, magnetic, and/or optical, etc.

coupling—linking in some fashion.

coupling—linking in some fashion.

create—to bring into being.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, and/or structure of deposit—to put, lay, place, position, and/or set down; and/or to fasten, fix, and/or secure.

detect—to sense, perceive, identify, discover, ascertain, respond to, and/or receive the existence, presence, and/or fact of.

determine—to find out, obtain, calculate, decide, deduce, ascertain, and/or come to a decision, typically by investigation, reasoning, and/or calculation.

device—a machine, manufacture, and/or collection thereof.

different—changed, distinct, and/or separate.

diffraction—the bending of a light ray in passing an edge formed by contiguous opaque and transparent edges.

digital—non-analog and/or discrete.

direction—a spatial relation between something and a course along which it points and/or moves; a distance independent relationship between two points in space that specifies the position of either with respect to the other; and/or a relationship by which the alignment and/or orientation of any position with respect to any other position is established.

discrete—separate, distinct, and/or individual.

distance—a measure of physical separation.

diverge—to go or extend in different directions from a common point.

divide—to separate and/or segregate.

dynamically—on demand, as necessary, and/or in an interactive manner wherein a current state is dependent on a past and/or future input and/or output.

edge—a periphery, border, and/or boundary.

electric—powered by electricity.

electrically—of, relating to, producing, or operated by electricity.

electrically coupled—connected in a manner adapted to allow a flow of electricity therebetween.

electro-active—a branch of technology concerning the interaction between various properties and electrical and/or electronic states of materials and/or involving components, devices, systems, and/or processes that operate by modifying the certain properties of a material by applying to it an electrical and/or magnetic field. Sub-branches of this technology include, but are not limited to, electro-optics.

electro-active element—a component that utilizes an electro-active effect, such as an electro-active filter, reflector, lens, shutter, liquid crystal retarder, active (i.e., non-passive) polarity filter, electro-active element that is movable via an electro-active actuator, and/or conventional lens movable by an electro-active actuator.

electro-optic—a branch of technology concerning the interaction between the electromagnetic (optical) and the electrical (electronic) states of materials and/or involving components, devices, systems, and/or processes that operate by modifying the optical properties of a material by applying to it an electrical field.

electrode—a conductor through which an electric current enters and/or leaves a substance whose electrical characteristics are being measured, used, and/or manipulated; a terminal point in a transistor, diode, and/or battery; and/or an electrically conducting element that emits and/or collects electrons and/or ions and/or controls their movement by means of an electric field applied to it.

emanate—to emit, radiate, and/or shine.

embed—to implant, fix, and/or set securely and/or deeply.

emission—the result of emitting.

emit—to give off, send forth, and/or discharge.

estimate—(n) a calculated value approximating an actual value; (v) to calculate and/or determine approximately and/or tentatively.

etch—to wear away the surface of material (such as a metal, glass, etc.) by chemical action, such as the action of an acid.

event—an occurrence and/or happening.

eye—an organ of vision and/or light sensitivity; and/or either of a pair of hollow structures located in bony sockets of the skull, functioning together or independently, each having a lens capable of focusing incident light on an internal photosensitive retina from which nerve impulses are sent to the brain.

far—a CTO distance of at least approximately 3 or more meters.

field—a region of space characterized by a physical property, such as gravitational or electromagnetic force or fluid pressure, having a determinable value at every point in the region.

field of view—a range of space over which a camera can obtain an image and/or the angle between two rays passing through the perspective center (rear nodal point) of a camera lens to the two opposite sides of the format.

first—an initial entity in an ordering of entities and/or immediately preceding the second in an ordering.

fixed—a stable and/or unalterable form.

flat—having a substantially planar major face and/or having a relatively broad surface in relation to thickness or depth.

focus—to cause energy and/or light to concentrate and/or converge.

for—with a purpose of form—to produce, make, create, generate, construct, and/or shape.

Fresnel lens—a thin optical lens comprising concentric rings of segmental lenses.

from—used to indicate a source, origin, and/or location thereof.

further—in addition.

gaze—to look and/or a direction one is looking.

generate—to create, produce, give rise to, and/or bring into existence.

gradient—a rate of change with respect to distance of a variable quantity.

grid—a network of lines, real or conceptual, that cross each other to form a series of regular shapes.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—possessing, characterized by, comprising, and/or including, but not limited to.

human-machine interface—hardware and/or software adapted to render information to a user and/or receive information from the user; and/or a user interface.

illuminate—to provide and/or brighten with light.

image—an at least two-dimensional representation of an object, entity, and/or phenomenon. Multiple images can be presented in a predetermined and timed sequence to recreate and/or produce an appearance of movement.

impinge—to collide and/or strike.

including—including but not limited to.

index of refraction—a measure of the extent to which a substance slows down light waves passing through it. The index of refraction of a substance is equal to the ratio of the velocity of light in a vacuum to its speed in that substance. Its value determines the extent to which light is refracted when entering or leaving the substance.

indium tin oxide—a solid solution of indium (III) oxide ($In_2O_3$) and tin (IV) oxide ($SnO_2$), typically 90% $In_2O_3$, 10% $SnO_2$ by weight, that is typically transparent and colorless in thin layers and can serve as a metal-like mirror in the infrared region of the electromagnetic spectrum. It is a widely used transparent conducting oxide due to its electrical conductivity and optical transparency. Thin films of indium tin oxide are most commonly deposited on surfaces by electron beam evaporation, physical vapor deposition, and/or a range of sputter deposition techniques.

individually—of or relating to a distinct entity.

information device—any device capable of processing data and/or information, such as any general purpose and/or special purpose computer, such as a personal computer, workstation, server, minicomputer, mainframe, supercomputer, computer terminal, laptop, tablet computer (such as an iPad-like device), wearable computer, Personal Digital Assistant (PDA), mobile terminal, Bluetooth device, communicator, "smart" phone (such as an iPhone-like device), messaging service (e.g., Blackberry) receiver, pager, facsimile, cellular telephone, traditional telephone, telephonic device, embedded controller, programmed microprocessor or microcontroller and/or peripheral integrated circuit elements, ASIC or other integrated circuit, hardware electronic logic circuit such as a discrete element circuit, and/or programmable logic device such as a PLD, PLA, FPGA, or PAL, or the like, etc. In general, any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc. In information device can be a component of and/or augment another device, such as an appliance, machine, tool, robot, vehicle, television, printer, "smart" utility meter, etc.

initialize—to prepare something for use and/or some future event.

input/output (I/O) device—any device adapted to provide input to, and/or receive output from, an information device. Examples can include an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached or connected.

inside—within a predetermined boundary.

install—to connect or set in position and prepare for use.

instructions—directions, which can be implemented as hardware, firmware, and/or software, the directions adapted to perform a particular operation and/or function via creation and/or maintenance of a predetermined physical circuit.

insulating—having a substantial resistance to the flow of electrical current.

into—toward, in the direction of, and/or to the inside of.

is—to exist in actuality.

layer—a single thickness of a material covering a surface or forming an overlying part or segment; a ply, strata, and/or sheet; a stratum, course, lamina, coating or sheet that is sufficiently recognizable as such regardless of the constituent material involved; and/or a discontinuous material or materials within a single plane having a single function.

lens—a piece of transparent substance, often glass and/or plastic, having two opposite surfaces either both curved or one curved and one plane, used in an optical device for changing the convergence and/or focal point of light rays; and/or an optical device that transmits light and is adapted to cause the light to refract, concentrate, and/or diverge. A lens can be an ophthalmic lens, such as a spectacle lens, an intra ocular lens, and/or a contact lens.

light—electromagnetic radiation having a wavelength within a range of approximately 300 nanometers to approximately 1000 nanometers, including any and all values and subranges therebetween, such as from approximately 400 to approximately 700 nm, from the near infrared through the long wavelength, far infrared, and/or from the ultraviolet to X-rays and/or gamma rays.

light emitting diode (LED)—a semiconductor device that emits (typically visible) light responsive to an applied electrical conducting current.

light source—a device adapted to emit light responsive to an applied electrical current.

liquid—a body of matter that exhibits a characteristic readiness to flow, little or no tendency to disperse, and relatively high incompressibility, including pumpable and/or flowable slurries and/or suspensions.

liquid crystal—any of various liquids in which the atoms or molecules are regularly arrayed in either one dimension or two dimensions, the order giving rise to optical properties, such as anisotropic scattering, associated with the crystals.

locate—to place, set, find, and/or situate in a particular spot, region, and/or position.

located—situated approximately in a particular spot and/or position.

location—a place where, and/or substantially approximating where, something physically exists.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine-implementable instructions—directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store one or more machine-implementable instructions, data, and/or information and/or obtain one or more stored machine-implementable instructions, data, and/or information. Examples include a memory device, punch card, player-piano scroll, etc.

macula—A minute area located near the center of the retina of the eye, at which visual perception is most acute.

manner—a mode of action.

match—to mirror, resemble, harmonize, fit, correspond, and/or determine a correspondence between, two or more values, entities, and/or groups of entities.

material—a substance and/or composition.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not preempting all uses of a fundamental principal.

middle—a CTO distance within a range of approximately 0.7 to approximately 1.3 meters.

more—a quantifier meaning greater in size, amount, extent, and/or degree.

mount—(n) that upon which a thing is attached. (v) to couple, fix, and/or attach on and/or to something.

multiple—more than one.

near—a CTO distance of less than approximately 0.2 meters.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

non-overlapping—not extending over or covering a part of object—a discrete thing that is real, perceptible, and tangible.

occurrence—an action, fact, and/or instance of occurring; and/or something that takes place.

offset—in a location near to but distinguishable from a given point or area.

one—being or amounting to a single unit, individual, and/or entire thing, item, and/or object.

onto—upon, to a position on, and/or on top of.

opposing—opposite; against; being the other of two complementary or mutually exclusive things; placed or located opposite, in contrast, in counterbalance, and/or across from something else and/or from each other.

optical—of or relating to light, sight, and/or a visual representation.

optical path—imaginary lines passing on the principal and secondary axes from the center of the retina to the object viewed.

or—used to indicate alternatives, typically appearing only before the last item in a group of alternative items.

organic light emitting diode—a self-luminous diode (it glows when an electrical field is applied to the electrodes) that typically does not require backlighting or diffusers.

orthogonal—perpendicular.

outside—the space beyond a boundary and/or limit.

overlap—to extend over and cover a part of packet—a generic term for a bundle of data organized in a specific way for transmission, such as within and/or across a network, such as a digital packet-switching network, and comprising the data to be transmitted and certain control information, such as a destination address.

perceptible—capable of being perceived by the human senses.

perpendicular—intersecting at or forming substantially right angles; and/or substantially at a right angle with respect to an axis.

phase—a relationship in time between successive states and/or cycles of an oscillating and/or repeating system (such as an alternating electric current, one or more light waves, and/or a sound wave) and: a fixed reference point; the states of another system; and/or the cycles of another system.

photograph—(n) an image created by collecting and focusing reflected electromagnetic radiation. The most common photographs are those created of reflected visible wavelengths, producing permanent records of what the human eye can see. (v) to record an image.

photolithography—a process whereby metallic foils, fluidic circuits, and/or printed circuits can be created by exposing a photosensitive substrate to a pattern, such as a predesigned structural pattern and/or a circuit pattern, and chemically etching away either the exposed or unexposed portion of the substrate.

photon—a particle representing a quantum of light and/or other electromagnetic radiation, the particle having zero rest mass and carrying energy proportional to the frequency of the radiation.

physical—tangible, real, and/or actual.

physically—existing, happening, occurring, acting, and/or operating in a manner that is tangible, real, and/or actual.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of portion—a part, component, section, percentage, ratio, and/or quantity that is less than a larger whole. Can be visually, physically, and/or virtually distinguishable and/or non-distinguishable.

position—(n) a place and/or location, often relative to a reference point. (v) to place and/or locate.

power—(n) a measure of an ability of a vision system, eye, lens, and/or lens-assisted eye, to refract, magnify, separate, converge, and/or diverge; and/or a general term that may refer to any power such as effective, equivalent, dioptric, focal, refractive, surface, and/or vergence power; and/or energy, a measure of energy and/or work, and/or a rate at which work is done, expressed as the amount of work per unit time and commonly measured in units such as watt and horsepower; (v) to energize, such as via applying electricity.

pre—a prefix that precedes an activity that has occurred beforehand and/or in advance.

predetermined—determined, decided, obtained, calculated, and/or established in advance.

prism—a substantially transparent body used for reflecting beams of light and/or separating white light passed through it into a spectrum.

probability—a quantitative representation of a likelihood of an occurrence.

processor—a machine that utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmatically—of, relating to, or having a program and/or instructions.

project—to calculate, estimate, or predict.

provide—to furnish, supply, give, convey, send, and/or make available.

pulse—a transient variation of a quantity (such as electric current or voltage) whose value is otherwise constant. Sometimes repeated with a regular period and/or according to some code.

radial—pertaining to that which radiates from and/or converges to a common center and/or has or is characterized by parts so arranged or so radiating.

receive—to get as a signal, take, acquire, and/or obtain.

recommend—to suggest, praise, commend, and/or endorse.

record—(v) to gather, capture, store, and/or preserve information on a tangible medium.

reduce—to make and/or become lesser and/or smaller.

region—an area and/or zone.

relative—considered with reference to and/or in comparison to something else.

relative position—a location with reference to a definable object.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, lens, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

request—to express a desire for and/or ask for.

resolution—a degree of sharpness of an image.

response—a reaction, reply, and/or answer to an influence and/or impetus.

retina—the light-sensitive membrane forming the inner lining of the posterior wall of the eyeball, composed largely of a specialized terminal expansion of the optic nerve. Images focused here typically are transmitted to the brain as nerve impulses.

ring—a substantially toroidal object that can be imagined as having been generated by rotating a closed loop (e.g., ellipse, circle, irregular curve, polygon, etc.) about a fixed line external to the loop.

scan—to move a finely focused beam of light or electrons in a systematic pattern over (a surface) in order to reproduce or sense and subsequently transmit an image.

scene—a place where action occurs and/or where an object of interest is present; something seen by a viewer; and/or a view and/or prospect.

select—to make a choice or selection from alternatives.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electro-magnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.

separated—not touching and/or spaced apart by something.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

sharpness—acuteness and/or distinctness.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

solid angle—a three-dimensional angle, formed by three or more planes intersecting at a common point. Its magnitude is measured in steradians, a unitless measure. The corner of a room forms a solid angle, as does the apex of a cone; one can imagine an indefinite number of planes forming the smooth round surface of the cone all intersecting at the apex. Solid angles are commonly used in photometry.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

spherical—of, relating to, and/or having a shape approximating that of a sphere.

steer—to guide, maneuver, and/or direct the course of.

store—to place, hold, and/or retain data, typically in a memory.

structure—something made up of a number of parts that are held and/or put together in a particular way.

substantially—to a great extent and/or degree.

substrate—an underlying material, region, base, stratum, course, lamina, coating, and/or sheet.

sufficiently—to a degree necessary to achieve a predetermined result.

support—to bear the weight of, especially from below.

surface—the outer boundary of an object and/or a material layer constituting and/or resembling such a boundary.

switch—(n.) a mechanical, electrical, and/or electronic device that opens and/or closes circuits, completes and/or breaks an electrical path, selects paths and/or circuits, and/or is adapted to switch; (v.) to: form, open, and/or close one or more circuits; form, complete, and/or break an electrical and/or informational path; alternate between electrically energizing and de-energizing; select a path and/or circuit from a plurality of available paths and/or circuits; and/or establish a connection between disparate transmission path segments in a network (or between networks).

system—a collection of mechanisms, devices, machines, articles of manufacture, processes, data, and/or instructions, the collection designed to perform one or more specific functions.

than—used to introduce the second element of a comparison, the first element of which expresses difference; used after adverbs such as rather or sooner to introduce a rejected alternative in an expression of preference; besides; and/or in addition to.

that—a pronoun used to indicate a thing as indicated, mentioned before, present, and/or well known.

toward—used to indicate a destination and/or in a physical and/or logical direction of.

transform—to change in measurable: form, appearance, nature, and/or character.

transmit—to send as a signal, provide, furnish, and/or supply.

transparent—clear; characterized by conveying incident light without reflecting or absorbing a substantial portion of that light; and/or having the property of transmitting rays of light through its substance so that bodies situated beyond or behind can be distinctly seen.

two—a cardinal number equal to one plus one.

unique—separate and distinct.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

variable—(n) a property, parameter, and/or characteristic capable of assuming any of an associated set of values. (adj) likely to change and/or vary; subject to variation; and/or changeable.

variable-focus—having the quality of adjustable focus in a single specified optic.

vary—to change, alter, and/or modify one or more characteristics and/or attributes of via—by way of and/or utilizing.

voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wavefront—a surface containing points affected in substantially the same way by a wave at a substantially predetermined time.

wearer—a person who don a garment and/or device.

weight—a value indicative of importance.

when—at a time and/or during the time at which.

wherein—in regard to which; and; and/or in addition to.

wireless—any communication technique that transmits a signal that does not require the use of a wire and/or guide connecting a transmitter and a receiver and/or utilizes electromagnetic waves emitted by an antenna (i.e., via an unguided medium), including such communication techniques as sonar, radio, cellular, cellular radio, digital cellular radio, ELF, LF, MF, HF, VHF, UHF, SHF, EHF, radar, microwave, satellite microwave, laser, infrared, etc., but excluding purely visual signaling, such as semaphore, smoke signals, sign language, etc., the communication technique having a baseband and/or carrier frequency ranging from about 1 Hz to about $2 \times 10^{14}$ Hz (about 200 teraHertz), including all values therebetween, such as for example, about 40 Hz, 6.010 kHz, 8.7 MHz, 4.518 GHz, 30 GHz, etc. and including all subranges therebetween, such as for example, from about 100 kHz to about 100 MHz, about 30 MHz to about 1 GHz, about 3 kHz to about 300 GHz, etc. Wireless communications can include analog and/or digital data, signals, and/or transmissions. Wireless communication can be via any of a plurality of protocols such as, for example, cellular CDMA, TDMA, GSM, GPRS, UMTS, W-CDMA, CDMA2000, TD-CDMA, 802.11a, 802.11b, 802.11g, 802.15.1, 802.15.4, 802.16, and/or Bluetooth, etc.

with—accompanied by.

with respect to—in relation to and/or relative to.

worn—donned by a wearer.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor (s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) appearing in a claim is followed by a drawing element number, that drawing element number is exemplary and non-limiting on claim scope.

No claim of this document is intended to invoke paragraph six of 35 USC 112 unless the precise phrase "means for" is followed by a gerund.

Any information in any material (e.g., a U.S. patent, U.S. patent application, book, article, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

The invention claimed is:

1. A method comprising:
   emitting, from a light source embedded in or mounted to a contact lens worn by a person, a beam of light; and
   deflecting the beam of light, with an optical element embedded in or mounted on the contact lens, toward a retina of the person; and
   modulating an intensity of the beam of light to form an image and/or text perceived by the person,
   wherein the optical element comprises a lens and deflecting the beam of light comprises focusing the beam of light,
   wherein the lens is a tunable lens and further comprising changing a focus of the beam of light.

2. The method of claim 1, wherein the light source comprises an array of light-emitting diodes (LEDs) configured to emit an array of beams of light including the beam of light.

3. The method of claim 1, wherein deflecting the beam of light comprises bending the beam of light by an amount sufficient to allow optical structures of an eye of the person to focus the light to a spot on the retina.

4. The method of claim 1, wherein deflecting the beam of light comprises steering the beam of light across a portion of the retina with the optical element.

5. A contact lens comprising:
   a substrate;
   a light source embedded in or mounted to the substrate and configured to emit a beam of light; and an optical element embedded in or mounted on the substrate in optical communication with the light source and configured to deflect the beam of light toward a retina of a person wearing the contact lens so as to form an image and/or text perceived by the person, wherein the optical element comprises a lens configured to focus the beam of light, wherein the lens is a tunable lens configured to change focus.

6. The contact lens of claim 5, wherein the light source is encapsulated within the substrate.

7. The contact lens of claim 5, wherein the light source is an array of light-emitting diodes (LEDs) configured to emit an array of beams of light including the beam of light.

8. The contact lens of claim 5, further comprising:
a controller operably coupled to the light source and configured to control the light source.

9. The contact lens of claim 5, further comprising:
a switch configured to control the light source based on a relative and/or absolute direction of a gaze of the person wearing the contact lens and/or a relative and/or absolute position and/or movement direction of a head of the person wearing the contact lens.

10. A contact lens comprising:
a substrate;
a light source embedded in or mounted to the substrate and configured to emit a beam of light; and
an optical element embedded in or mounted on the substrate in optical communication with the light source and configured to deflect the beam of light toward a retina of a person wearing the contact lens so as to form an image and/or text perceived by the person, wherein the light source is injection-molded within the substrate.

11. The contact lens of claim 10, wherein the optical element is configured to bend the beam of light by an amount sufficient to allow optical structures of an eye of the person to focus the light to a spot on the retina.

12. The contact lens of claim 10, wherein the optical element is configured to steer the beam of light across a portion of the retina.

13. The contact lens of claim 10, wherein the optical element comprises a prism configured to refract the beam of light.

14. The contact lens of claim 10, wherein the optical element comprises a lens configured to focus the beam of light.

15. The contact lens of claim 14, wherein the lens is a tunable lens configured to change focus.

16. The contact lens of claim 14, wherein the lens is a collimating lens configured to focus the beam of light from a widely diverging beam to a less diverging beam that is close to an average optical divergence for passing through an eye of the person and forming a point of light on the retina.

17. A contact lens comprising:
means for emitting a beam of light; and
means for deflecting the beam of light; and
means for modulating an intensity of the beam of light to form an image and/or text perceived by a person wearing the contact lens.

* * * * *